United States Patent
Kluj et al.

(10) Patent No.: US 10,730,796 B2
(45) Date of Patent: Aug. 4, 2020

(54) INORGANIC FIRE PROTECTION AND INSULATION FOAM AND USE THEREOF

(71) Applicant: HILTI AKTIENGESELLSCHAFT, Schaan (LI)

(72) Inventors: Esther Rahel Kluj, Landsberg am Lech (DE); Sebastian Simon, Buchloe Lindenberg (DE); Mario Paetow, Igling (DE); Jekaterina Miller, Augsburg (DE)

(73) Assignee: Hilti Aktiengesellschaft, Schaan (LI)

( * ) Notice: Subject to any disclaimer, the term of this patent is extended or adjusted under 35 U.S.C. 154(b) by 122 days.

(21) Appl. No.: 15/775,806

(22) PCT Filed: Dec. 1, 2016

(86) PCT No.: PCT/EP2016/079424
§ 371 (c)(1),
(2) Date: May 11, 2018

(87) PCT Pub. No.: WO2017/093398
PCT Pub. Date: Jun. 8, 2017

(65) Prior Publication Data
US 2018/0327313 A1    Nov. 15, 2018

(30) Foreign Application Priority Data

Dec. 3, 2015 (EP) .................... 15197813

(51) Int. Cl.
| | | |
|---|---|---|
| C04B 28/14 | (2006.01) | |
| C04B 14/02 | (2006.01) | |
| C04B 14/20 | (2006.01) | |
| C04B 14/42 | (2006.01) | |
| C04B 16/06 | (2006.01) | |
| C04B 38/02 | (2006.01) | |
| F16L 5/04 | (2006.01) | |
| C04B 111/28 | (2006.01) | |
| C04B 111/00 | (2006.01) | |
| C04B 103/12 | (2006.01) | |
| C04B 103/22 | (2006.01) | |
| C04B 111/40 | (2006.01) | |

(52) U.S. Cl.
CPC .......... *C04B 28/146* (2013.01); *C04B 14/024* (2013.01); *C04B 14/202* (2013.01); *C04B 14/42* (2013.01); *C04B 16/0683* (2013.01); *C04B 28/145* (2013.01); *C04B 38/02* (2013.01); *F16L 5/04* (2013.01); *C04B 2103/12* (2013.01); *C04B 2103/22* (2013.01); *C04B 2111/00663* (2013.01); *C04B 2111/00689* (2013.01); *C04B 2111/00698* (2013.01); *C04B 2111/00706* (2013.01); *C04B 2111/28* (2013.01); *C04B 2111/285* (2013.01); *C04B 2111/40* (2013.01); *C04B 2201/30* (2013.01)

(58) Field of Classification Search
CPC ... C04B 28/146; C04B 28/145; C04B 14/024; C04B 14/202; C04B 14/42; C04B 16/0683; C04B 38/02; C04B 2111/28; C04B 2111/00663; C04B 2103/12; C04B 2103/22; C04B 2111/00689; C04B 2111/00698; C04B 2111/00706; C04B 2111/285; C04B 2111/40; C04B 2201/30; F16L 5/04
See application file for complete search history.

(56) References Cited

U.S. PATENT DOCUMENTS

| | | | |
|---|---|---|---|
| 4,171,985 A | 10/1979 | Motoki et al. | |
| 4,298,394 A * | 11/1981 | Leeming | C04B 28/14 106/781 |
| 2004/0256605 A1 | 12/2004 | Reinheimer et al. | |
| 2014/0234560 A1* | 8/2014 | Miyata | E04D 13/1675 428/35.7 |

FOREIGN PATENT DOCUMENTS

| | | |
|---|---|---|
| DE | 24 42 233 | 4/1976 |
| DE | 27 56 227 | 6/1978 |
| DE | 2 930 164 | 2/1980 |
| DE | 44 44 160 | 6/1996 |
| DE | 103 60 029 | 7/2005 |
| EP | 1 489 136 | 12/2004 |
| EP | 2 045 227 | 4/2009 |

OTHER PUBLICATIONS

International Search Report mailed in PCT/EP2016/079424 and dated Feb. 1, 2017.
Written Opinion of the International Searching Authority mailed in PCT/EP2016/079424 and dated Feb. 1, 2017.

* cited by examiner

*Primary Examiner* — Andrew J. Oyer
(74) *Attorney, Agent, or Firm* — Grüneberg and Myers PLLC

(57) ABSTRACT

A hydraulically binding composition can be used to produce an inorganic fire-protection and/or insulation foam. The composition includes: (i) a hydraulic binder, (ii) a blowing-agent mixture, (iii) a thermally expandable compound, and (iv) optionally a foam stabilizer, where the at least one thermally expandable compound, depending on a particle size thereof and an adjusted density of a foamed composition, is present in a quantity such that a foam structure of the foamed composition is not destroyed by expansion thereof during heating of the composition above an onset temperature thereof.

22 Claims, No Drawings

INORGANIC FIRE PROTECTION AND INSULATION FOAM AND USE THEREOF

This application is a National Stage entry under § 371 of International Application No. PCT/EP2016/079424, filed on Dec. 1, 2016, and claims priority to European Patent Application No. 15197813,7, filed on Dec. 3, 2015.

The invention relates to an inorganic fire-protection and insulation foam, especially a fire-protection and/or insulation foam-in-place foam based on a hydraulically binding composition, as well as to the use thereof.

In Europe, fire-protection systems must satisfy the fire-protection requirements of the DIN/EN standards, which essentially permit temperature conduction from the fire side to the air side by at most 180 K at defined places. In addition, it must be ensured that fire and smoke gases cannot break through.

Organic or inorganic fire-protection systems are often used as binders for mounting, insulating and fire-protection foams. These may be applied, for example, as 1-component, 2-component aerosol cans or as 2-component cartridge foam. Especially for foam-in-place foams, which are applied in place by the user, it would be very advantageous if the substances with which the user comes into contact were as harmless as possible.

Organic fire-protection systems have the disadvantage that they are greatly altered by the fire. An adequate fire-resistance rating can be achieved only by formation of a resistant ash crust. A high proportion of fire-protection additives is needed for this ash crust. These ingredients are expensive. In addition, flame-retardant agents are frequently also needed to reduce the combustibility. However, the organic systems contribute to increasing the fire load and are therefore disadvantageous precisely in the vicinity of escape routes. Frequently, the organic systems are subject to marking requirements and therefore are usable only under particular prerequisites and protective measures of the user.

Inorganic foams based on gypsum/cement, as described in EP 2 045 227 A1, for example, have the property that they are indeed fire resistant and hardly shrink in the fire situation and ideally do not shrink at all, as is the case of organically-based systems due to ingredients that burn away, but due to their solid structure they do not permit any intumescence (swelling in the fire situation). Because of this intumescence, as occurs due to expandable graphite, for example, they are either destroyed or they do not permit any expansion. On the other hand, for example in the case of cables with thicker plastic insulation, a gap due to swelling of the insulation at high temperature is formed in many inorganic fire-protection foams. This may lead to failure of the sealing in the fire situation. Therefore these inorganic systems cannot be used for all fire-protection applications or fire-protection products that require swelling, such as is necessary, for example, in the case of thicker plastic insulation of cables, empty cable conduits and the like.

The object of the present invention now consists in providing an intumescent foam system that can be processed in place on the construction site, simply and with high foam yield (at a density of 150 to 800 kg/m$^3$), and without use of machinery, to create a fire-protection foam with increased fire-resistance rating.

The object is solved by providing a hydraulically binding composition, which contains
 (i) at least one hydraulic binder,
 (ii) a blowing-agent mixture,
 (iii) at least one thermally expandable compound and
 (iv) optionally a foam stabilizer wherein the at least one thermally expandable compound, depending on its particle sizes and the adjusted density of the foamed composition, is contained in a quantity such that the foam structure of the foamed composition is not destroyed by its expansion during heating of the composition above its onset temperature.

Surprisingly, it has been found that, in a firewall foamed with the inventive composition, no greater gap formation occurs around the cables with thicker cable insulation in the fire situation due to the presence of a thermally expandable compound. Due to the swelling and subsequent burning away of the insulation of cables, for example, at high temperature, a gap that may lead to premature failure of the sealing is formed in the known gypsum foams. The inventors have found that the swelling thermally expandable compounds are able to close this gap despite the solid structure of the cured composition, without destroying the cell structure of the cured composition and thereby impairing the fire-protection properties of the composition, provided the conditions for use of the thermally expandable compound are appropriately selected.

The inventive compositions further have the advantage, especially compared with fire-protection foams on an organic basis, that they can be formulated without marking. Moreover, they can be classified as incombustible and therefore also be used in escape routes, for example. Furthermore, the compositions are very attractive in terms of price.

The hydraulic binders have an almost neutral to alkaline pH in water. Any mineral composition that cures irreversibly to stone-like hardness upon contact with water is understood as a hydraulic binder. Binders with short setting times, such as quick-setting cement, are particularly preferred for this purpose, since the setting process takes place so quickly therein that the foam formed by the blowing-agent mixture does not already begin to collapse before it has attained sufficient inherent stability due to the binder. Complete setting is not necessary for this purpose; a setting stage in which the foam is self-supporting is already sufficient. In this connection, setting speeds are of advantage in which the foam attains inherent stability after at most 60 minutes, preferably after at most 40 minutes, particularly after at most 30 minutes, quite particularly preferably after at most 20 minutes.

Preferably the hydraulic binder comprises inorganic binders such as cement or gypsum, or else mixtures of various binders. Suitable inorganic binders are: magnesium chloride cements, Portland cements, pozzolan cements, blast-furnace cements, so-called quick-setting cements, metal oxide cements and the like. Calcium sulfate binders, such as α and β calcium sulfate hemihydrate (CaSO$_4$.½H$_2$O), stucco, plaster of Paris or anhydrite (CaSO$_4$) are particularly suitable because of the hydrate water content in bound form and because of the good processability. Harder gypsum types, such as α calcium sulfate hemihydrate, optionally in accelerated form, are particularly suitable.

The hydraulic binder may be cured with a curing agent that is normally used for the purpose. This is generally water or an aqueous solution, which optionally may contain further ingredients of the composition and/or additives.

It is advantageous in these binder systems used according to the invention that they set under ambient temperatures, without any firing process such as is necessary for ceramic systems. Furthermore, the neutral or alkaline pH of the binder matrix has a noncorrosive or even corrosion-inhibiting effect upon contact with metals. Thus galvanized steel is not attacked, and no more so is copper, as used in conduit systems, attacked by such binders. This is of advantage in particular when the inventive composition is used for foaming of penetrations or the like, through which the conduit systems are routed.

In a preferred embodiment, the hydraulic binder is a calcium sulfate binder, among which harder types in particular are preferred, such as α calcium sulfate hemihydrate, since the probability that their foam structure will become destroyed by the expansion of the thermally expandable compound is lower.

In the dry sealing masses, the hydraulic binder should be present in proportions of 10 to 90, preferably 30 to 80 wt %.

For foam formation, the composition is foamed according to the invention by liberation of a blowing agent, especially a blowing gas, during the setting process. As blowing agents, all common blowing agents are suitable that are liberated in particular by chemical reaction between two ingredients of the blowing-agent mixture, i.e. that form a gas as the actual blowing agent. Accordingly, the composition contains, according to the invention, a blowing-agent mixture, which comprises compounds that, only after being mixed, react with one another with formation of carbon dioxide ($CO_2$), hydrogen ($H_2$), oxygen ($O_2$) or nitrogen ($N_2$). In a particular embodiment, the chemical reaction of the ingredients of the blowing-agent component takes place in the presence of water. Hereby the storage stability of the inventive composition may be increased, since undesired degradation of the blowing-agent components does not take place in the absence of water and only due to addition of water, such as mixing water in the application situation, for example, is liberation of the blowing agent initiated and thus foaming of the composition is begun.

In a preferred embodiment, the blowing-agent mixture comprises a combination of a compound that is capable of liberating oxygen, a so-called oxygen carrier, and a catalyst, for liberation of the oxygen.

Preferably peroxides, such as hydrogen peroxide, for example, especially in aqueous solution, or compounds that liberate hydrogen peroxide, including solid compounds, such as the hydrogen peroxide/urea complex, sodium percarbonate and urea phosphate, for example, are used as the oxygen carrier.

Metal oxides and/or bases are used as the catalyst. Preferably, manganese dioxide ($MnO_2$) is used. What is decisive is that the catalyst used is able to assume various oxidation states, the redox potentials of which are so close to one another that both oxidation and reduction are able to occur during the reaction with hydrogen peroxide, and thus the catalyst is not consumed. This is illustrated by means of the following schematic reaction equations, where M is a transition metal:

$$2\ M^{II}O + 2H_2O_2 \rightarrow M^{III}{}_2O_2 + 2H_2O + \tfrac{1}{2}O_2$$

$$M^{III}{}_2O_3 + H_2O_2 \rightarrow 2M^{II}O + H_2O + O_2$$

The advantage of blowing-agent mixtures based on an oxygen carrier and a catalyst lies in the fact that the rate of decomposition of the oxygen carrier and thus the foam-formation rate can be controlled via the quantity of catalyst used. On the other hand, the foam height or the pore volume of the foam can be controlled via the quantity of oxygen carrier used. Thus higher quantities of catalyst lead to more spontaneous oxygen liberation and higher quantities of oxygen carrier lead to an increased pore volume and thus to a lower density of the foamed fire-protection mass.

Inventive, oxygen-liberating blowing-agent mixture contain, relative to the inventive composition in the dry state, a catalyst in a proportion of approximately 0.01 to 5 wt %, preferably 0.05 to 3 wt %, particularly preferably of approximately 0.1 to 2 wt % as well as an oxygen carrier in a proportion of approximately 0.1 to 10 wt %, preferably 0.2 to 7 wt %, particularly preferably of approximately 1.0 to 6 wt %.

In an alternative embodiment, the blowing-agent mixture comprises an acid and a compound that is able to react with acids to form carbon dioxide.

Carbonate-containing and hydrogen carbonate-containing compounds, especially metal or (especially quaternary) ammonium carbonates or ammonium hydrogen carbonates may be used as compounds that are able to react with acids to form carbon dioxide, such as carbonates or hydrogen carbonates of alkali metals or alkaline earth metals, for example $CaCO_3$, $NaHCO_3$, $Na_2CO_3$, $K_2CO_3$, $(NH_4)_2CO_3$ and the like, wherein $CaCO_3$ (chalk) is preferred. In this connection, various types of chalks with different grain sizes and different surface texture can be used, such as, for example, coated or uncoated chalk, or mixtures of two or more of those. Coated chalk types are preferably used, since they react more slowly with the acid and thus ensure controlled foaming or matched foaming and curing time. Likewise, mixtures of various carbonates or hydrogen carbonates may be used.

Any acid compound capable of reacting with carbonate-containing or hydrogen carbonate-containing compounds with elimination of carbon dioxide may be used as the acid. Suitable acids are mineral acids, such as hydrochloric acid, sulfuric acid and phosphoric acid, and also organic acids, such as ascorbic acid, polyacrylic acid, benzoic acid, toluenesulfonic acid, tartaric acid, glycolic acid, lactic acid; organic mono-, di- or polycarboxylic acids, such as acetic acid, chloroacetic acid, trifluoroacetic acid, fumaric acid, maleic acid, citric acid or the like, aluminum dihydrogen phosphate, sodium hydrogen sulfate, potassium hydrogen sulfate, aluminum chloride, urea phosphate and other acid-liberating chemicals or mixtures of two or more thereof. The acid generates the gas as the actual blowing agent.

As the acid component, an aqueous solution or an inorganic and/or organic acid may be used. Furthermore, buffered solutions of citric, tartaric, acetic, phosphoric acid and the like may be used. This aqueous solution can simultaneously be used as curing agent for the hydraulic binder.

It is also possible, however, for the acid to exist as a solid, for example in the form of an acid salt of a mineral acid, such as monosodium phosphate.

The carbonate/hydrogen carbonate compound and/or the solid acid component may be used in coated or uncoated form. Fatty acids, waxes or metal oxides such as magnesium oxide, for example, may be considered as materials for the coating. Such coating of one or both components enhances the storage stability of the entire composition, since an undesired degradation reaction does not take place prior to use. This use of a solid acid component makes it possible to formulate one-component systems which, by mixing with water, are caused to react and therefore to cure only at the point of use.

In a further, alternative embodiment, the blowing-agent mixture comprises compounds that evolve hydrogen when they react with one another. The following reactions are possible for this purpose:

(i) one or more base metals (e.g. aluminum, iron or zinc) with bases (e.g. one or more alkali metal hydroxides, such as sodium, potassium or lithium hydroxide) or with one or more acids, such as defined above for the carbonates (preferably inorganic acids);

(ii) metal hydrides (e.g. sodium hydride or lithium aluminum hydride) with water, or (iii) a compound that contains Si-bound hydrogen atoms (e.g. polymethyl hydrogen siloxane, also known as polymethylhydrosiloxane, but also other polyalkyl- or polyaryl hydrogen siloxanes) with proton donors (e.g. water). Among other possibilities, polyhydrogen siloxanes, tetramers, copolymers of dimethysiloxane and methylhydrosiloxane, trimethylsilyl-terminated polyhydrogen siloxanes, hydride-terminated polydimethylsiloxanes, triethylsilyl-terminated polyethylhydrosiloxanes, hydride-terminated copolymers of polyphenylmethylsiloxane and methylhydrosiloxane and the like are suitable.

Furthermore, even aluminum chips may be considered as a further possible ingredient of the blowing-agent mixture, provided the remaining components of the composition expose them to a strongly alkaline pH during mixing with water. In this case, due to the reaction of the aluminum with water according to $$2Al + 6H_2O \rightarrow 2Al(OH)_3 + 3H_2$$

hydrogen gas, which is able to foam the composition, is evolved under alkaline conditions. For this purpose, the pH should be higher than 10, preferably higher than 11 or 12, in order to ensure the fastest possible reaction of aluminum and thus the fastest possible liberation of blowing gas.

From safety-related viewpoints, the use of blowing-agent mixtures that liberate oxygen or carbon dioxide have advantages and are therefore preferred compared to those that foam the composition by evolution of hydrogen.

If the acid exists in liquid form, such inventive compositions are designed as two-component systems, in which the carbonate/hydrogen-carbonate compound together with the other solid ingredients forms the first component and the acid is contained in a second, liquid component. Likewise, in the case of a solid acid component, this dissolved in water is able to function as the second component.

The density of the foamed composition is adjusted via the blowing-agent mixture, in which case the density is selected to correspond to the requirements or to the desired use of the inventive composition. The blowing-agent mixture is particularly preferably added in such a proportion that the composition yields a foam with a density lower than 800 g/L (<800 g/L).

Inventive, carbon dioxide-liberating blowing-agent mixtures contain, relative to the inventive composition in the dry state, a carbonate and/or hydrogen carbonate compound preferably in a proportion of approximately 0.1 to 10 wt %, preferably 0.2 to 7 wt %, particularly preferably of approximately 0.5 to 5 wt % as well as an acid in a proportion of approximately 0.1 to 15 wt %, preferably 1 to 12 wt %, particularly preferably of approximately 1 to 10 wt %, respectively relative to the total formulation.

In order to impart greater stability to the formed foam, the formed cells must remain stable until curing of the binder, in order to prevent collapse of the polymeric foam structure. Stabilization is all the more necessary the lower the density of the foamed material is to be, i.e. the greater the volume expansion is and the longer the setting time is. Stabilization is usually achieved by means of foam stabilizers. This means on the one hand that the gases liberated in the fire-protection mass by the blowing-agent mixture form gas bubbles as finely dispersed as possible and thus yield a fine-pored foam, which has good fire-protection properties, and on the other hand that this foam is stabilized until the binder imparts sufficient stability to the foam to prevent collapse of the foam. Moreover, the pore size of the foam can be influenced by the foam stabilizer. In this connection, the type of stabilizer, the proportion in which it is used and the binder used are all factors. The desired pore size and structure can then be determined by a few experiments and thus adapted to the intended use.

To the extent necessary, therefore, the inventive composition may further contain a foam stabilizer. Examples of foam stabilizers suitable for use are anionic, cationic, amphoteric and nonionic surfactants as well as mixtures thereof, bentonite, starch and starch derivatives, gelatins, cellulose and cellulose derivatives or polymers and polymer dispersions, hydrophobed calcium carbonate ($CaCO_3$), hydrophobed titanium dioxide ($TiO_2$), hydrophobed aluminum oxide ($Al_2O_3$) or mixtures of the hydrophobed compounds and the like, alkyl polyglycosides, EO/PO block copolymers, alkyl or aryl alkoxylates, siloxane alkoxylates, esters of sulfosuccinic acid and/or alkali metal or alkaline earth metal alkanoates. These are available according to methods known in themselves to the person skilled in the art, by reaction of longer-chain monohydric alcohols with mono-, di- or polysaccharides. The longer-chain monohydric alcohols, which optionally may also be branched, preferably have 4 to 22C atoms, preferably 8 to 18C atoms and particularly preferably 10 to 12C atoms in an alkyl moiety. Specifically, 1-butanol, 1-propanol, 1-hexanol, 1-octanol, 2-ethylhexanol, 1-decanol, 1-undecanol, 1-dodecanol (lauryl alcohol), 1-tetradecanol (myristyl alcohol) and 1-octadecanol (stearyl alcohol) may be mentioned as longer-chain monohydric alcohols. Mixtures of the said longer-chain monohydric alcohols may also be used. Alternatively, it is also possible to use a suspension of colloidal particles as stabilizing agents. In this respect, reference is made to WO 2007/068127 A1, the contents of which are incorporated herewith in the present Application. Preferably, hydrophobed calcium carbonate ($CaCO_3$), hydrophobed titanium dioxide ($TiO_2$), hydrophobed aluminum oxide ($Al_2O_3$) and or mixtures thereof are used.

The foam stabilizers may be contained in any one of the components of the inventive composition, as long as they do not react with one another.

The foam stabilizers may be used in a proportion of 0.1 to 10 wt %, preferably 0.2 to 8 wt %, particularly preferably of approximately 1 to 4 wt %, relative to the total formulation.

According to the invention, the composition contains at least one thermally expandable compound. "Thermally expandable" in this context means that the compound increases its volume upon exceeding a particular temperature, known as the onset temperature. This "onset temperature" is the temperature at which the thermally induced expansion begins. The volume increase takes place by the swelling of an individual compound, which under the effect of heat liberates gases that cause the volume increase, even though no chemical reaction has occurred between two or more compounds. This thermally expandable compound is preferably selected from among graphite intercalation compounds (expandable graphite), expandable silicate material or combinations thereof, in which case graphite intercalation compounds (expandable graphite) or expandable vermiculite are preferred.

Known intercalation compounds of $SO_x$, $NO_x$, halogen and/or strong acids in graphite can be considered as examples of graphite intercalation compounds. These are also referred to as graphite salts. Graphite intercalation compounds that evolve $SO_2$, $SO_3$, NO and/or $NO_2$ while expanding at temperatures (onset temperatures) of 120 to 350° C., for example, are preferred. The graphite intercalation compounds preferably exist in the form of flakes, although other forms are also possible. The size of the flakes correlates with the volume generated by the graphite intercalation compounds as they expand due to heating.

In order to obtain the fire-protection properties of the foamed inventive composition after it has cured, its foam structure must not be destroyed by the expansion of the thermally expandable compound. In this connection, the inventors have found that the proportion of thermally expandable compound on the one hand and the size of the particles and thus the expansion volume or the resulting expansion pressure on the other hand are critical.

Accordingly, a compound having expansion properties such as expansion volume and expansion pressure that do not destroy the foam structure of the inventive composition when the composition is heated above the onset temperature of the thermally expandable compound is to be selected as at least one thermally expandable compound. Furthermore, the proportion of the thermally expandable compound is to be selected such that expansion of this compound indeed takes place over the surface and in the cells of the foam, but this does not destroy the foam structure when the composition is heated above the onset temperature of the thermally expandable compound.

Preferably, therefore, at least one thermally expandable compound and its proportion are selected such that the foam formed from the composition—after it has been cured—is not destroyed by the expansion properties such as expansion volume and expansion pressure of the thermally expandable compound when the inventive composition is heated above the onset temperature of the at least one thermally expandable compound. Whether the foam is destroyed can be recognized from the fact that the structure is not degraded in the fire situation by convection of flames. By means of experiments, the person skilled in the art will be able without difficulty to find which thermally expandable compound may be used in which proportion without destruction of the foam structure of the composition.

In one embodiment, the thermally expandable compound is a graphite intercalation compound, in which case it has proved advantageous when the expansion volume of the thermally expandable compound is greater than 70 mL/g. preferably greater than 120 mL/g, particularly preferably greater than 200 mL/g. Considering that the expansion volume correlates with the particle size of the compounds among other factors, a particle size of at least 80%>75 μm is preferred, of 80%>150 μm is further preferred and of 80%>300 μm is particularly preferred.

In an alternative embodiment, the thermally expandable compound is an expandable vermiculite, in which case it has proved advantageous when the expansion volume is greater than 3 mL/g, preferably greater than 5 mL/g, particularly preferably greater than 10 mL/g. The particle size of this expandable vermiculite preferably lies in the range of 0.5 to 2 mm.

Graphite intercalation compounds suitable for the present invention are commercially available. In general, the compounds are uniformly distributed in the inventive fire-protection elements. In this respect, reference is made to EP 1489136 A1, the contents of which are incorporated herewith in the present Application.

The inventors have further found that the proportion of thermally expandable compound used correlates with the desired or adjusted density of the foam. Thus, in slightly foamed compositions, even smaller proportions of thermally expandable compound, especially in the case of compounds that are capable of generating a high expansion rate or a high expansion pressure, lead to destruction of the foam or to spalling of the outer regions of the cured composition.

According to the invention, the at least one thermally expandable compound, depending on its particle sizes and the adjusted density of the foamed composition, is contained in a quantity such that the foam structure of the foamed composition is not destroyed by its expansion of the thermally expandable composition during heating of the composition above its onset temperature. This means that compounds with lower expansion volume may be contained in a larger proportion and vice versa.

Accordingly, for a thermally expandable compound that generates a high expansion volume, such as the graphite intercalation compounds, for example, it is proposed that their proportion relative to the total composition be selected as follows, depending on the desired foam density:

0.5 to 6 wt %, preferably 0.8 to 4 wt %, particularly preferably 1.0 to 2.5 wt %, for desired foam densities of 150 to 300 g/L, 0.4 to 5 wt %, preferably 0.6 to 3 wt %, and particularly preferably 1.0 to 2.0 wt %, for desired foam densities of 300 to 600 g/L, and 0.3 to 4 wt %, preferably 0.5 to 2.5 wt %, particularly preferably 0.8 to 1.5 wt %, for desired foam densities of 600 to 800 g/L.

In this connection, a "high expansion volume" means an expansion by more than 40 times the original volume prior to expansion.

Furthermore, for a thermally expandable compound that generates a low expansion volume, such as expandable vermiculite, for example, it is proposed that their proportion relative to the total composition be selected as follows, depending on the desired foam density:

1 to 25 wt %, preferably 3 to 20 wt %, for desired foam densities of 150 to 300 g/L, 0.5 to 15 wt %. preferably 2 to 15 wt %, for desired foam densities of 300 to 600 g/L, 0.4 to 10 wt %, preferably 1 to 10 wt %, for desired foam densities of 600 to 800 g/L, In this connection, a "low expansion volume" means an expansion by up to 20 times the original volume prior to expansion.

Furthermore, it may be provided that the inventive composition also contains further constituents and/or additives, in order to optimize the application properties of the inventive composition. As an example, such constituents or additives may be selected from among plasticizers, retarders, stabilizers, anti-foaming agents, accelerators, corrosion inhibitors, fillers and the like. In this connection, one and the same additive may also contain several of the foregoing groups.

For example, the inventive composition may contain at least one plasticizer, especially in proportions of 0.01 to 5 wt %, preferably 0.05 to 2 wt %, particularly preferably 0.1 to 1.0 wt %, relative to the composition. Examples of plasticizers preferred according to the invention are plasticizers based on modified polycarboxylate ethers. In particular, the plasticizers are selected in such a way that they reduce the water demand during mixing and in addition they also lead advantageously to or promote particularly good early strength development.

Furthermore, the inventive composition may contain an additive that improves or influences the rheological and/or physical properties for optimization of the application properties. For example, this may be based on a polymer binder that can be redispersed in water, preferably formed on the basis of vinyl acetate and ethylene (ethylene/vinyl acetate copolymer), Such an additive may be used especially in proportions of 1 to 15 wt %, preferably 2 to 10 wt %, relative to the composition.

In order to adjust the setting properties of the composition and to adapt them to the respective application needs, the inventive composition may further contain a setting retarder or a setting accelerator.

Particularly effective setting accelerators for binders based substantially on calcium sulfate, which also includes mixtures of gypsum with other hydraulic binders, such as cement, for example, in which gypsum is the main ingredient of the binder component, are accelerators based on potassium sulfate ($K_2SO_4$) and/or based on finely ground gypsum or calcium sulfate dihydrate ($CaSO_4.2H_2O$). Further, it is possible to use, as the setting accelerator, a mixture of calcium sulfate dihydrate ($CaSaO_4.2H_2O$) and a surface-active agent, wherein the surface-active agent is selected in the form of one or more synthetic, water-soluble, anionic surface-active agents from the group of solid sodium alkylate sulfonates and sodium lauryl sulfates or one or more synthetic, water-soluble, solid, nonionic surface-active agents. In this respect, reference is made to DE 2 930 164 C2, the contents of which are incorporated herewith in the present Application.

As an example, compounds such as alkali metal or alkaline earth metal carbonates, particularly preferably lithium carbonate, are used as setting accelerators for binders based on cement. This is particularly advantageous, since hereby the setting rate of the binder can be controlled. By virtue of these substances, the setting rate can be adjusted such that, on the one hand, a sufficiently long processing life of the fire-protection mass mixed with water is possible and, on the other hand, the binder permits the fire-protection foam to become self-stabilized sufficiently rapidly, before it begins to collapse into itself after foaming.

On the other hand, the setting rate can be adjusted via these additives such that the inherent stability of the foam is not already reached at a time at which the blowing-gas mixture has not yet completely reacted. The proportion in which the setting accelerator is usually used depends on the nature of the selected hydraulic binder. In the case of cement as the hydraulic binder, the setting accelerator may be used in proportions of 0.001 to 1 wt %, especially 0.05 to 0.25 wt %, relative to the composition. In the case of gypsum as the hydraulic binder, the setting accelerator may be used in proportions of 0.1 to 10 wt %, especially 0.2 to 3 wt %, relative to the composition.

Furthermore, the inventive composition may also contain at least one anti-foaming agent, for example a fixed combination of liquid hydrocarbons, polyglycols and amorphous silica. Such an anti-foaming agent may be used especially in proportions of 0.001 to 1 wt %, preferably 0.05 to 3 wt %, relative to the dry mixture. The foam structure and the pore volume of the foam may be influenced by the use of anti-foaming agents in combination with the foam stabilizers used according to the invention.

For all aforesaid quantitative data, it may optionally be necessary, due to the individual case or application technique, to deviate from the said proportions. The decision in this regard lies within the discretion of the person skilled in the art.

Beyond this, the inventive composition may also contain polymers, such as acrylates or polyurethanes, for example in the form of an aqueous dispersion.

Moreover, the inventive composition may contain at least one additive for adjustment of the water retention capacity. As an example, cellulose derivatives, especially cellulose ethers, are suitable for this purpose.

A further preferred embodiment of the inventive composition is characterized in that the composition contains inorganic fillers selected from aluminum oxides, aluminum hydroxides, aluminum silicates, bauxite, boric acid, borax, calcium silicates, feldspars, kaolins, magnesium oxides, magnesium hydroxides, mullite, perlite, fireclay, mica, silicon carbide, clays, zeolite, glass foam, glass hollow beads or fly ash. This is particularly advantageous, since the mechanical properties of the fire-protection foam can be improved by these fillers. In particular, shrinkage of the fire-protection foam under intense thermal load can be prevented by the use of such fillers.

Particularly preferred fillers are lightweight fillers, since the density of the fire-protection foams can be reduced by use of these fillers, without reducing the mechanical load capacity.

The lightweight aggregates suitable according to the invention include lightweight aggregates based on natural gravels, lightweight aggregates based on natural raw materials. lightweight aggregates based on gravels manufactured from industrial byproducts and lightweight aggregates based on industrial byproducts.

Appropriately, the lightweight filler used according to the invention may be selected, for example, from mineral lightweight fillers. The lightweight fillers usable according to the invention have a grain gross density within the meaning of DIN 4226-2 (February 2002) below 2000 kg/m$^3$, preferably below 1200 kg/m$^3$, particularly preferably below 800 kg/m$^3$, quite particularly preferably below 500 kg/m$^3$ or even 300 kg/m$^3$.

Non-limitative examples for lightweight aggregates suitable according to the invention are: glass, plastic or ceramic hollow microspheres, expandable glass, expandable mica (vermiculite), expandable perlite, expandable shale, expandable clay, sintered bituminous coal fly ash, brick chippings, natural pumice, tuff, lava (lava slag), pumice slag and furnace bottom ash.

According to a further preferred embodiment, the inventive composition contains these fibers and/or woven or nonwoven fabrics of fibers, wherein the fibers are selected from among glass, cellulose, polyethylene, polypropylene, polyimide or carbon fibers, rock wool or mineral wool. This is particularly advantageous, because the danger of crack formation, especially due to thermal load in the fire situation, can be considerably reduced by the use of such fibers. Moreover, the flexural strength and the modulus of elasticity of the foamed fire-protection masses are increased by the use of such materials. Together with the thermally expandable compounds, the plastic fibers have a synergistic effect, in that they support preservation of the function of the structure and ensure that the thermally expandable compound is not blown away after expansion. They melt and glaze the thermally expandable compounds and thus form a stable framework.

The inventive composition may be packaged as a two-component or multi-component system, wherein the term multi-component system also includes two-component systems. The composition is preferably packaged as a two-component system, in which the individual ingredients of the blowing-agent mixture are separated from one another to ensure inhibition of reaction prior to use of the composition, and the hydraulic binder is separated from the mixing water to ensure inhibition of reaction prior to use of the composition. Depending on their compatibility with one another and with the compounds contained in the composition, the further ingredients of the composition are divided and may be contained in one of the two components or in both components. Furthermore, the division of the further ingredients, especially of the solid ingredients, may depend on the proportions in which they are to be contained in the composition. By appropriate division, it is optionally possible to achieve a higher proportion relative to the total composition. The thermally expandable compound may then be contained as the total mixture in one component or divided proportionally into several components. Preferably, the components of a two-component system are mixed with one another at or close to the point of use and the mixture is applied at the desired place. This is the case of so-called foam-in-place foams.

Further subject matter of the invention is the use of an inventive composition for foaming of openings, cable and pipe penetrations in walls, floors and/or ceilings, of joints between ceilings and wall parts, between masonry openings and construction parts to be installed, such as window and door frames, between ceilings and walls and between outside walls and curtain-wall facades of buildings for the purpose of fire protection. In this connection, the components of the inventive composition are mixed with one another at or close to the point of use and the mixture is introduced or applied at the desired place, for example in a gap, in a cavity or on a surface.

Further subject matter of the invention are fire-protection devices, such as molded blocks, for example, which can be obtained by the method just described, wherein production may take place in a mold, for example. In this context it is conceivable to use a molded block to manufacture molded blocks that will be inserted in masonry openings, e.g. cable bulkheads. Other preferred uses include the bulkheading of cables, pipes, busbars and/or joints. They may also be used preferably as seals for fire protection and for manufacture of fire-protection adhesive compounds, for coating of surfaces and for manufacture of sandwich building parts or composite panels. For this purpose, an inventive composition is mixed with a suitable quantity of water, then filled into a hollow body containing one or more cavities, where the composition cures while forming a fire-protection foam. The suitable quantity of water is guided primarily by the quantity and type of binder used, and may be easily determined by the person skilled in the art via some manual experiments. As an example, this water quantity is such that the ratio of solids content of the inventive composition to water ranges from 5:1 to 1:1. This method is particularly advantageous, because the fire-protection foam is formed only after the mold or the hollow body has been filled and so all cavities are automatically filled due to expansion of the foam during the setting process. Thereby it is possible to produce, with an inventive fire-protection foam, fire-protection devices, that are filled almost completely with the fire-protection foam, even if they are irregularly shaped.

Such fire-protection devices are therefore superior to those designed, for example, with fire-protection mats, since the latter, without further measures, cannot ensure complete filling of the fire-protection device. A further advantage is that this inventive method can also be carried out on a construction site, in order to provide masonry penetrations or door frames with a fire-retardant finish.

The molded blocks foam up in the fire situation and consequently flame propagation is prevented, thus making them suitable as sealing elements, safety devices, fire barriers or claddings. They may therefore be used as grouting and as seals for cable penetrations as well as for sealing of masonry openings.

The invention will be explained in more detail hereinafter on the basis of some examples.

EXEMPLARY EMBODIMENTS

The individual components listed in the examples and comparison examples are respectively mixed and homogenized. For use, these mixtures are mechanically mixed with one another in a container until homogeneous intermixing has been achieved and until foaming has begun.

Gas-Burner Test

To appraise the behavior of the foamed inventive composition in the fire situation, a firewall was respectively created. For this purpose, a penetration with a diameter of 82 mm was created by means of a core drill in an aerated concrete block with a depth of 100 mm. By means of the compositions described in the comparison examples and examples, a cable (EN 1366-3; B-cable/NYY 1×95 RM-J; outside diameter 19 mm; PVC sheath; length 170 mm) was installed centrally in the penetration over the entire depth of the aerated concrete block, such that the space between the cable and the wall of the aerated concrete block was filled with foam. After the composition had cured, the firewall was flamed for 30 minutes from a distance of 25 cm with a supplied-air gas burner (natural gas/air, rating approximately 8 kW; "Thuringer Model" ESL100 benchtop burner, Herbert Arnold Co.). The condition of the composition, especially the foam structure, was appraised by visual inspection, and the interfaces to the cable as well as to the inside wall of the penetration were examined for ring formation.

COMPARISON EXAMPLE 1

β-Gypsum without Expandable Compound

| Ingredient | Content [wt %] |
|---|---|
| Calcium sulfate (hemihydrate)[a] | 58.8 |
| Manganese dioxide[b] | 0.3 |
| Calcium carbonate, coated[c] | 3.2 |
| Glass fibers[d] | 1.2 |
| Gypsum (dihydrate)[e] | 0.5 |
| 3% hydrogen peroxide solution | 36.0 |

[a] Building and electrical plaster (β-gypsum), Baumit GmbH
[b] Manganese gray, Kremer Pigmente GmbH & Co. KG
[c] Omyabond 520-OM; Omya GmbH
[d] Short-cut glass fibers, FGCS 70-30/3, STW Co.
[e] Lenzin (calcium sulfate dihydrate), Kremer Pigmente GmbH & Co. KG

COMPARISON EXAMPLE 2

α-Gypsum without Expandable Compound

| Ingredient | Content [wt %] |
|---|---|
| Calcium sulfate (hemihydrate)[a] | 60.5 |
| Manganese dioxide[b] | 0.4 |
| Calcium carbonate, coated[c] | 3.8 |
| Natural gypsum[d] | 2.0 |
| Plastic fibers[e] | 1.3 |
| 3% hydrogen peroxide solution | 32.0 |

[a] Siladent high-strength formulated plaster HF1 (α-gypsum), Siladent Dr. Böhme & Schöps GmbH
[b] Manganese gray, Kremer Pigmente GmbH & Co. KG

| Ingredient | Content [wt %] |
|---|---|
| c) Omyabond 520-OM, Omya GmbH | |
| d) Lenzin (calcium sulfate dihydrate), Kremer Pigmente GmbH & Co. KG | |
| e) Polyester fiber filler 231/100; STW Co. | |

COMPARISON EXAMPLE 3

α-Gypsum with Expandable Graphite; Too High Foam Density

| Ingredient | Content [wt %] |
|---|---|
| Calcium sulfate (hemihydrate)a) | 65.5 |
| Manganese dioxideb) | 0.3 |
| Calcium carbonate, coatedc) | 3.6 |
| Natural gypsumd) | 1.5 |
| Pentaerythritole) | 2.3 |
| Expandable graphitef) | 1.9 |
| Plastic fibersg) | 2.7 |
| 3% hydrogen peroxide solution | 22.2 | a) Siladent high-strength formulated plaster HF1 (alpha gypsum), Siladent Dr. Böhme & Schöps GmbH
b) Manganese gray, Kremer Pigmente GmbH & Co. KG
c) Omyabond 520-OM, Omya GmbH
d) Lenzin (calcium sulfate dihydrate), Kremer Pigmente GmbH & Co. KG
e) Charmor ® PM 40, of Perstorp
f) Nord-Min 351, of Nordmin Engineering Ltd
g) Short-cut polyester cord filaments 164 S/4 mm, STW Co.

COMPARISON EXAMPLE 4

α-Gypsum with too High Proportion of Expandable Graphite

| Ingredient | Content [wt %] |
|---|---|
| Calcium sulfate (hemihydrate)a) | 55.4 |
| Manganese dioxideb) | 0.5 |
| Calcium carbonate, coatedc) | 3.0 |
| Natural gypsumd) | 1.8 |
| Pentaerythritole) | 1.9 |
| Expandable graphitef) | 7.0 |
| Glass fibersg) | 1.9 |
| 3% hydrogen peroxide solution | 28.5 | a) Siladent high-strength formulated plaster HF1 (alpha gypsum), Siladent Dr. Böhme & Schöps GmbH
b) Manganese black, Kremer Pigmente GmbH & Co. KG
c) Omyabond 520-OM, Omya GmbH
d) Lenzin (calcium sulfate dihydrate), Kremer Pigmente GmbH & Co. KG
e) Charmor ® PM 40, Perstorp
f) Nord-Min 351, of Nordmin Engineering Ltd
g) Short-cut glass fibers, FGCS 70-30/3, STW Co.

COMPARISON EXAMPLE 5

α-Gypsum with Very Fine Expandable Graphite Particles

| Ingredient | Content [wt %] |
|---|---|
| Calcium sulfate (hemihydrate)a) | 59.0 |
| Manganese dioxideb) | 0.5 |
| Calcium carbonate, coatedc) | 3.2 |
| Natural gypsumd) | 2.4 |
| Pentaerythritole) | 1.9 |
| Expandable graphitef) | 2.0 |
| Glass fibersg) | 2.0 |
| 3% hydrogen peroxide solution | 29.0 | a) Siladent high-strength formulated plaster HF1 (alpha gypsum), Siladent Dr. Böhme & Schöps GmbH
b) Manganese black, Kremer Pigmente GmbH & Co. KG
c) Omyabond 520-OM, Omya GmbH
d) Lenzin (calcium sulfate dihydrate), of Kremer Pigmente GmbH & Co. KG
e) Charmor ® PM 40, Perstorp
f) Nord-Min 20 (at least 80% below 75 μm), of Nordmin Engineering Ltd
g) Short-cut glass fibers, FGCS 70-30/3, STW Co.

EXAMPLE 1

α-Gypsum with Expandable Graphite

| Ingredient | Content [wt %] |
|---|---|
| Calcium sulfate (hemihydrate)a) | 59.0 |
| Manganese dioxideb) | 0.4 |
| Calcium carbonate, coatedc) | 3.2 |
| Natural gypsumd) | 1.3 |
| Pentaerythritole) | 2.0 |
| Expandable graphitef) | 1.7 |
| Plastic fibersg) | 2.4 |
| 3% hydrogen peroxide solution | 30.0 | a) Siladent high-strength formulated plaster HF1 (α-gypsum), Siladent Dr. Böhme & Schöps GmbH
b) Manganese gray, Kremer Pigmente GmbH & Co. KG
c) Omyabond 520-OM, Omya GmbH
d) Lenzin (calcium sulfate dihydrate), Kremer Pigmente GmbH & Co. KG
e) Charmor ® PM 40, Perstorp
f) Nord-Min 351, of Nordmin Engineering Ltd
g) Short-cut polyester cord filaments 164 S/1 mm, STW Co.

EXAMPLE 2

α-Gypsum with Expandable Vermiculite

| Ingredient | Content [wt %] |
|---|---|
| Calcium sulfate (hemihydrate)a) | 52.1 |
| Manganese dioxideb) | 0.4 |
| Calcium carbonate, coatedc) | 2.9 |
| Natural gypsumd) | 2.1 |
| Pentaerythritole) | 1.6 |
| Vermiculite (fine)f) | 10.0 |
| Glass fibersg) | 1.9 |
| 3% hydrogen peroxide solution | 29.0 | a) Casea Spezial 40 (α-gypsum), Siladent Dr. Böhme & Schöps GmbH
b) Manganese gray, Kremer Pigmente GmbH & Co. KG
c) Omyabond 520-OM, Omya GmbH
d) Lenzin (calcium sulfate dihydrate), Kremer Pigmente GmbH & Co. KG
e) Charmor ® PM 40, Perstorp
f) Vermiculite ADT-V052; ADT Co.
g) Short-cut glass fibers, FGCS 70-30/3, STW Co.

EXAMPLE 3

α-Gypsum with Cement Content and Expandable Graphite

| Ingredient | Content [wt %] |
|---|---|
| Calcium sulfate (hemihydrate)[a] | 51.5 |
| Manganese dioxide[b] | 0.5 |
| Calcium carbonate, coated[c] | 2.8 |
| Natural gypsum[d] | 2.0 |
| Pentaerythritol[e] | 1.6 |
| Expandable graphite[f] | 1.3 |
| Glass fibers[g] | 1.3 |
| Cement[h] | 10.0 |
| 3% hydrogen peroxide solution | 29.0 |

[a] Siladent high-strength formulated plaster HF1 (α-gypsum), Siladent Dr. Böhme & Schöps GmbH
[b] Manganese gray, Kremer Pigmente GmbH & Co. KG
[c] Omyabond 520-OM, Omya GmbH
[d] Lenzin (calcium sulfate dihydrate), Kremer Pigmente GmbH & Co. KG
[e] Charmor ® PM 40, Perstorp
[f] Nord-Min 20 (at least 80% below 75 µm), Nordmin Engineering Ltd
[g] Short-cut glass fibers, FGCS 70-30/3, STW Co.
[h] Secar 51, Kerneos Co.

TABLE 1

Properties of the exemplary formulations (foam density, setting time, observations in the gas-burner test)

| Example | Foam density [g/L] | Setting time [min] | Observation in the gas-burner test |
|---|---|---|---|
| Comparison 1 | 220 | ~15 | Cracking and fissuring |
| Comparison 2 | 210 | ~10 | Slight cracking |
| Comparison 3 | 400 | ~10 | Degradation and destruction of the foam |
| Comparison 4 | 240 | ~9 | Degradation and destruction of the foam |
| Comparison 5 | 235 | ~9 | Slight cracking and partial degradation of the foam |
| 1 | 230 | ~11 | No cracking and no degradation of the foam |
| 2 | 300 | ~11 | No cracking and no degradation of the foam |
| 3 | 260 | ~25 | No cracking and no degradation of the foam |

The invention claimed is:

1. A hydraulically binding composition for producing an inorganic fire-protection and/or insulation foam, the composition comprising:
   (i) at least one hydraulic binder,
   (ii) a blowing-agent mixture,
   (iii) at least one thermally expandable compound, and
   (iv) optionally a foam stabilizer,
   wherein a content of said at least one thermally expandable compound is such that a foam structure of a foamed composition is not destroyed by expansion thereof during heating of the composition above an onset temperature of said thermally expandable compound.

2. The composition according to claim 1, wherein:
   the proportion of thermally expandable compound is between 0.5 and 25 wt % and a foam density is from 150 g/L to 300 g/L, or
   the proportion of thermally expandable compound is between 0.4 and 15 wt % and a foam density is from 300 g/L to 600 g/L, or
   the proportion of thermally expandable compound is between 0.3 and 10 wt % and a foam density is from 600 g/L to 800 g/L,
   in each case relative to the total composition.

3. The composition according to claim 1, wherein the at least one thermally expandable compound is at least one member selected from the group consisting of a graphite intercalation compounds and an expandable silicate material.

4. The composition according to claim 3, wherein the at least one thermally expandable compound is a graphite intercalation compound, and wherein:
   the proportion of the graphite intercalation compound is between 0.5 and 6 wt % and a foam density is from 150 g/L to 300 g/L, or
   the proportion of the graphite intercalation compound is between 0.4 and 5 wt % and a foam density is from 300 g/L to 600 g/L, or
   the proportion of the graphite intercalation compound is between 0.3 and 4 wt % and a foam density is from 600 g/L to 800 g/L,
   in each case relative to the total composition.

5. The composition according to claim 3, wherein the at least one thermally expandable compound is an expandable vermiculite, and wherein:
   the proportion of expandable vermiculite is between 1 and 25 wt % and a foam density is from 150 g/L to 300 g/L, or
   the proportion of expandable vermiculite is between 0.5 and 15 wt % and a foam density is from 300 g/L to 600 g/L, or
   the proportion of expandable vermiculite is between 0.4 and 10 wt % a foam density is from 600 g/L to 800 g/L,
   in each case relative to the total composition.

6. The composition according to claim 3, wherein, the at least one thermally expandable compound is a graphite intercalation compound.

7. The composition according to claim 6, wherein, the graphite intercalation compound has a particle size of at least 80%>75 µm and is present in a proportion of approximately 0.3 to approximately 6.0 wt %, relative to the total composition.

8. The composition according to claim 1, wherein the at least one hydraulic binder is a pH-neutral or alkaline binder.

9. The composition according to claim 8, wherein the hydraulic binder is at least one member selected from the group consisting of cement, trass, pozzolan, hydraulic lime, and gypsum.

10. The composition according to claim 1, wherein the blowing-agent mixture comprises compounds that, after being mixed, react with one another with formation of at least one of carbon dioxide, hydrogen, oxygen, and nitrogen.

11. The composition according to claim 1, wherein the blowing-agent mixture comprises an oxygen carrier and a catalyst.

12. The composition according to claim 1, wherein the composition further comprises at least one member selected from the group consisting of fiber, a woven fabric of fiber, and a nonwoven fabric of fiber, and wherein the fiber is at least one member selected from the group consisting of glass, cellulose, polyethylene, polypropylene, polyester, polyamide fiber, carbon fiber, rock wool, and mineral wool.

13. The composition according to claim 1, wherein the composition further comprises a setting retarder or a setting accelerator.

14. The composition according to claim 1, wherein the foam stabilizer is at least one member selected from the group consisting of hydrophobed calcium carbonate, hydrophobed titanium dioxide, hydrophobed barium sulfate, hydrophobed aluminum, a surfactant, bentonite, starch, a starch derivative, a gelatin, cellulose, a cellulose derivative, a polymer, and a polymer dispersion.

15. An inorganic fire-protection foam, which is produced by a process that comprises reacting
the hydraulically binding composition according to claim 1, and
water or an aqueous solution.

16. The fire-protection foam according to claim 15, wherein the foam in a set dry state has a density of <800 g/L.

17. A fire-protection device, comprising:
a fire-protection foam according to claim 15.

18. The fire-protection device according to claim 17, wherein the fire-protection foam is configured as a molded block or as a filling in a door, a door frame, a hollow profile, a partition wall or a ceiling panel.

19. A method for producing a fire-protection device, the method comprising:
mixing the composition according to claim 1 with water or aqueous solution to obtain a mixture, and then
filling the mixture into a hollow body comprising one or more cavities, wherein the composition cures while forming a fire-protection foam.

20. A method of foaming a space to impart fire protection to the space, the method comprising:
applying the inorganic fire-protection foam according to claim 15 to the space, wherein the space is selected from the group consisting of an opening, a cable, a pipe penetration in a wall, a floor, a ceiling, a joint between a ceiling and a wall part, an opening between a masonry part and a construction part, an opening between a ceiling and a wall, and an opening between an outside wall and a curtain-wall facade of a building.

21. A method of producing a fire-protection device or a firestop, the method comprising:
incorporating the inorganic fire-protection foam according to claim 15 into a fire-protection device or into a firestop.

22. The composition according to claim 1, wherein said composition excludes mica.

* * * * *